US 6,619,727 B1

(12) United States Patent
Barz et al.

(10) Patent No.: US 6,619,727 B1
(45) Date of Patent: Sep. 16, 2003

(54) STRUCTURAL REINFORCEMENT SYSTEM FOR AUTOMOTIVE VEHICLES

(75) Inventors: William J. Barz, Shelby Township, MI (US); Thomas L. Coon, Lapeer, MI (US); Michael J. Czaplicki, Rochester, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 09/655,965

(22) Filed: Sep. 6, 2000

Related U.S. Application Data

(63) Continuation of application No. 09/502,686, filed on Feb. 11, 2000.

(51) Int. Cl.[7] ............... B62D 25/04; E04C 3/30
(52) U.S. Cl. ............... 296/187; 296/203.02; 296/205; 296/146.6; 296/203.03
(58) Field of Search ............... 296/187, 205, 296/203.02, 209, 901, 146.6, 203.03, 188, 189; 52/735.1, 736.1

(56) References Cited

U.S. PATENT DOCUMENTS

| 1,814,677 | A | 7/1931 | Fennema |
| 3,054,636 | A | 9/1962 | Wessells, III |
| 3,123,170 | A | 3/1964 | Bryant |
| 3,493,257 | A | 2/1970 | Fitzgerald et al. |
| 3,649,375 | A | 3/1972 | Venkatesen |
| 3,665,968 | A | 5/1972 | DePutter |
| 3,746,387 | A | 7/1973 | Schwenk |
| 3,757,559 | A | 9/1973 | Welsh |
| 3,868,796 | A | 3/1975 | Bush |
| 3,890,108 | A | 6/1975 | Welsh |
| 4,019,301 | A | 4/1977 | Fox |

(List continued on next page.)

FOREIGN PATENT DOCUMENTS

| DE | 2919046 | 5/1979 |
| DE | 9011147.8 | 9/1990 |
| DE | 4028895 C1 | 2/1992 |
| DE | 9320333.0 | 6/1994 |
| DE | 19812288 C1 | 5/1999 |
| DE | 198 12 288 C1 | 5/1999 |
| DE | 198 56 255 C1 | 1/2000 |
| DE | 19856255 C1 | 1/2000 |
| DE | 19858903 A1 | 6/2000 |
| EP | 82102135.9 | 3/1982 |
| EP | 90202150.0 | 8/1990 |

(List continued on next page.)

OTHER PUBLICATIONS

Written Opinion dated Jan. 3, 2002 for Application No. PCT/US01/01648.
Copending U.S. application Ser. No. 09/858,939 filed May 16, 2001.
Copending U.S. application Ser. No. 09/859,126 filed May 16, 2001.
Copending U.S. application Ser. No. 09/906,289 filed Jul. 16, 2001.

(List continued on next page.)

Primary Examiner—Joseph D. Pape
Assistant Examiner—H. Gutman
(74) Attorney, Agent, or Firm—Dobrusin & Thennisch PC

(57) ABSTRACT

An automotive vehicle frame reinforcement system has a skeleton member designed to be secured to a vehicle frame, such as a roof or pillar section. An expandable material, such as an epoxy-based reinforcing foam, is disposed on the skeleton member. Once the system is attached to the frame, the foam expands and cures during an automobile assembly operation, bonding the reinforcement system to the frame. As a result, the reinforcement system provides enhanced load distribution over the vehicle frame without adding excessive weight.

11 Claims, 4 Drawing Sheets

U.S. PATENT DOCUMENTS

| | | | |
|---|---|---|---|
| 4,029,128 A | 6/1977 | Yamagishi | |
| 4,082,825 A | 4/1978 | Puterbaugh | |
| 4,083,384 A | 4/1978 | Horne et al. | |
| 4,090,734 A | 5/1978 | Inami et al. | |
| 4,238,540 A | 12/1980 | Yates et al. | |
| 4,378,395 A | 3/1983 | Asoshina et al. | |
| 4,397,490 A | 8/1983 | Evans et al. | |
| 4,440,434 A | 4/1984 | Celli | |
| 4,457,555 A | 7/1984 | Draper | |
| 4,463,870 A | 8/1984 | Coburn, Jr. et al. | |
| 4,559,274 A | 12/1985 | Kloppe et al. | |
| 4,610,836 A | 9/1986 | Wycech | |
| 4,613,177 A | 9/1986 | Loren et al. | |
| 4,695,343 A | 9/1987 | Wycech | |
| 4,705,716 A | 11/1987 | Tang | |
| 4,732,806 A | 3/1988 | Wycech | |
| 4,751,249 A | 6/1988 | Wycech | |
| 4,762,352 A | 8/1988 | Enomoto | |
| 4,769,391 A | 9/1988 | Wycech | |
| 4,803,108 A | 2/1989 | Leuchten et al. | |
| 4,813,690 A | 3/1989 | Coburn, Jr. | |
| 4,822,011 A | 4/1989 | Goldbach et al. | |
| 4,836,516 A | 6/1989 | Wycech | |
| 4,853,270 A | 8/1989 | Wycech | |
| 4,861,097 A | 8/1989 | Wycech | |
| 4,898,630 A | 2/1990 | Kitoh et al. | |
| 4,901,395 A | 2/1990 | Semrau | |
| 4,901,500 A | 2/1990 | Wycech | |
| 4,908,930 A | 3/1990 | Wycech | |
| 4,917,435 A | 4/1990 | Bonnett et al. | |
| 4,922,596 A | 5/1990 | Wycech | |
| 4,923,902 A | 5/1990 | Wycech | |
| 4,946,737 A | 8/1990 | Lindeman et al. | |
| 4,978,562 A | 12/1990 | Wycech | |
| 4,984,406 A | 1/1991 | Friesen | |
| 4,989,913 A | 2/1991 | Moore, III | |
| 4,995,545 A | 2/1991 | Wycech | |
| 5,040,803 A | 8/1991 | Cieslik et al. | |
| 5,072,952 A | 12/1991 | Irrgeher et al. | |
| 5,102,188 A | 4/1992 | Yamane | |
| 5,122,398 A | 6/1992 | Seiler et al. | |
| 5,124,186 A | 6/1992 | Wycech | |
| 5,213,391 A * | 5/1993 | Takagi | 296/205 |
| 5,255,487 A | 10/1993 | Wieting et al. | |
| 5,266,133 A * | 11/1993 | Hanley et al. | 156/71 |
| 5,344,208 A | 9/1994 | Bien et al. | |
| 5,358,397 A | 10/1994 | Ligon et al. | |
| 5,373,027 A | 12/1994 | Hanley et al. | |
| 5,382,397 A | 1/1995 | Turner, Jr. | |
| 5,395,135 A | 3/1995 | Lim et al. | |
| 5,506,025 A | 4/1996 | Otto et al. | |
| 5,560,672 A | 10/1996 | Lim et al. | |
| 5,575,526 A * | 11/1996 | Wycech | 296/205 |
| 5,577,784 A | 11/1996 | Nelson | |
| 5,580,120 A | 12/1996 | Nees et al. | |
| 5,642,914 A | 7/1997 | Takabatake | |
| 5,648,401 A | 7/1997 | Czaplicki et al. | |
| 5,649,400 A | 7/1997 | Miwa | |
| 5,652,039 A | 7/1997 | Tremain et al. | |
| 5,660,116 A | 8/1997 | Dannawi et al. | |
| 5,707,098 A * | 1/1998 | Uchida et al. | 296/189 |
| 5,725,272 A | 3/1998 | Jones | |
| 5,731,069 A | 3/1998 | Delle Donne et al. | |
| 5,755,486 A * | 5/1998 | Wycech | 296/188 |
| 5,766,719 A | 6/1998 | Rimkus | |
| 5,785,376 A | 7/1998 | Nees et al. | |
| 5,786,394 A | 7/1998 | Slaven | |
| 5,803,533 A | 9/1998 | Schulz et al. | |
| 5,804,608 A | 9/1998 | Nakazato et al. | |
| 5,806,915 A | 9/1998 | Takabatake | |
| 5,806,919 A * | 9/1998 | Davies | 296/205 |
| 5,819,408 A | 10/1998 | Catlin | |
| 5,851,626 A | 12/1998 | McCorry et al. | |
| 5,855,094 A | 1/1999 | Baudisch et al. | |
| 5,866,052 A | 2/1999 | Muramatsu | |
| 5,871,849 A | 2/1999 | Lepine | |
| 5,878,784 A | 3/1999 | Sales et al. | |
| 5,884,960 A * | 3/1999 | Wycech | 296/146.6 |
| 5,885,688 A | 3/1999 | McLaughlin | |
| 5,888,600 A * | 3/1999 | Wycech | 428/35.9 |
| 5,888,642 A | 3/1999 | Meteer et al. | |
| 5,894,071 A | 4/1999 | Merz et al. | |
| 5,901,528 A | 5/1999 | Richardson | |
| 5,901,752 A | 5/1999 | Lundman | |
| 5,902,656 A | 5/1999 | Hwang | |
| 5,904,024 A | 5/1999 | Miwa | |
| 5,932,680 A | 8/1999 | Heider | |
| 5,934,737 A | 8/1999 | Abouzahr | |
| 5,941,597 A * | 8/1999 | Horiuchi et al. | 296/205 |
| 5,979,902 A * | 11/1999 | Chang et al. | 277/316 |
| 5,984,389 A | 11/1999 | Nuber et al. | |
| 5,985,435 A | 11/1999 | Czaplicki et al. | |
| 5,988,734 A | 11/1999 | Longo et al. | |
| 5,992,923 A * | 11/1999 | Wycech | 296/188 |
| 5,994,422 A | 11/1999 | Born et al. | |
| 5,997,077 A | 12/1999 | Siebels et al. | |
| 6,003,274 A | 12/1999 | Wycech | |
| 6,004,425 A | 12/1999 | Born et al. | |
| 6,006,484 A | 12/1999 | Geissbuhler | |
| 6,022,066 A | 2/2000 | Tremblay et al. | |
| 6,033,300 A | 3/2000 | Schneider | |
| 6,040,350 A * | 3/2000 | Fukui | 521/135 |
| 6,050,630 A | 4/2000 | Hochet | |
| 6,053,210 A | 4/2000 | Chapman et al. | |
| 6,058,673 A * | 5/2000 | Wycech | 52/721.4 |
| 6,059,342 A | 5/2000 | Kawai et al. | |
| 6,068,424 A | 5/2000 | Wycech | |
| 6,073,991 A * | 6/2000 | Naert | 296/901 |
| 6,077,884 A | 6/2000 | Hess et al. | |
| 6,079,180 A * | 6/2000 | Wycech | 296/205 |
| 6,082,811 A | 7/2000 | Yoshida | |
| 6,090,232 A | 7/2000 | Seeliger et al. | |
| 6,092,864 A * | 7/2000 | Wycech et al. | 296/205 |
| 6,094,798 A | 8/2000 | Seeliger et al. | |
| 6,096,403 A * | 8/2000 | Wycech | 296/146.6 |
| 6,096,791 A | 8/2000 | Born et al. | |
| 6,099,948 A | 8/2000 | Paver, Jr. | |
| 6,102,379 A | 8/2000 | Ponslet et al. | |
| 6,102,473 A | 8/2000 | Steininger et al. | |
| 6,103,341 A | 8/2000 | Barz et al. | |
| 6,103,784 A | 8/2000 | Hilborn et al. | |
| 6,110,982 A | 8/2000 | Russick et al. | |
| 6,129,410 A * | 10/2000 | Kosaraju et al. | 296/203.03 |
| 6,131,897 A | 10/2000 | Barz et al. | |
| 6,135,542 A * | 10/2000 | Emmelmann et al. | 296/205 |
| 6,146,565 A | 11/2000 | Keller | |
| 6,149,227 A | 11/2000 | Wycech | |
| 6,150,428 A | 11/2000 | Hanley, IV et al. | |
| 6,152,260 A | 11/2000 | Eipper et al. | |
| 6,153,709 A | 11/2000 | Xiao et al. | |
| 6,165,588 A * | 12/2000 | Wycech | 296/188 |
| 6,168,226 B1 | 1/2001 | Wycech | |
| 6,174,932 B1 | 1/2001 | Pachl et al. | |
| 6,189,953 B1 | 2/2001 | Wycech | |
| 6,196,621 B1 | 3/2001 | VanAssche et al. | |
| 6,197,403 B1 | 3/2001 | Brown et al. | |
| 6,199,940 B1 * | 3/2001 | Hopton et al. | 296/187 |
| 6,232,433 B1 | 5/2001 | Narayan | |
| 6,233,826 B1 | 5/2001 | Wycech | |
| 6,237,304 B1 | 5/2001 | Wycech | |
| 6,247,287 B1 | 6/2001 | Takabatake | |

| | | | | | | |
|---|---|---|---|---|---|---|
| 6,253,524 B1 * | 7/2001 | Hopton et al. ............ 296/187 | WO | PCT/US96/11155 | 7/1996 | |
| 6,263,635 B1 | 7/2001 | Czaplicki | WO | PCT/US97/10693 | 6/1997 | |
| 6,270,600 B1 | 8/2001 | Wycech | WO | PCT/US97/07644 | 11/1997 | |
| 6,272,809 B1 | 8/2001 | Wycech | WO | PCT/US97/19981 | 11/1997 | |
| 6,276,105 B1 | 8/2001 | Wycech | WO | PCT/US98/08980 | 5/1998 | |
| 6,277,898 B1 | 8/2001 | Pachl et al. | WO | WO 98/36944 | 8/1998 | |
| 6,281,260 B1 | 8/2001 | Hanley, IV et al. | WO | PCT/US98/17994 | 9/1998 | |
| 6,287,666 B1 | 9/2001 | Wycech | WO | PCT/US99/00035 | 1/1999 | |
| 6,296,298 B1 | 10/2001 | Barz | WO | PCT/US99/00770 | 1/1999 | |
| 6,303,672 B1 | 10/2001 | Papalos et al. | WO | PCT/US98/16461 | 2/1999 | |
| 6,305,136 B1 * | 10/2001 | Hopton et al. ........ 296/146.6 | WO | PCT/US99/01855 | 2/1999 | |
| 6,311,452 B1 | 11/2001 | Barz et al. | WO | PCT/US99/01865 | 2/1999 | |
| 6,315,938 B1 | 11/2001 | Jandali | WO | PCT/US99/04263 | 3/1999 | |
| 6,319,964 B1 | 11/2001 | Blank et al. | WO | PCT/US99/04279 | 3/1999 | |
| 6,321,793 B1 | 11/2001 | Czaplicki et al. | WO | PCT/CA99/00424 | 5/1999 | |
| 6,332,731 B1 | 12/2001 | Wycech | WO | PCT/US99/10441 | 5/1999 | |
| 6,341,467 B1 * | 1/2002 | Wycech ................. 52/721.4 | WO | PCT/US99/11109 | 5/1999 | |
| 6,348,513 B1 | 2/2002 | Hilborn et al. | WO | PCT/US99/11110 | 5/1999 | |
| 6,368,438 B1 * | 4/2002 | Chang et al. ............... 156/79 | WO | PCT/US99/11194 | 5/1999 | |
| 6,372,334 B1 | 4/2002 | Wycech | WO | PCT/US99/11195 | 5/1999 | |
| 6,378,933 B1 * | 4/2002 | Schoen et al. ............ 296/188 | WO | PCT/EP99/03832 | 6/1999 | |
| D457,120 S | 5/2002 | Broccardo et al. | WO | WO 99/28575 | 6/1999 | |
| 6,382,635 B1 | 5/2002 | Fitzgerald | WO | PCT/EP99/06112 | 8/1999 | |
| 6,389,775 B1 | 5/2002 | Steiner et al. | WO | PCT/US99/18820 | 8/1999 | |
| 6,406,078 B1 | 6/2002 | Wycech | WO | PCT/EP99/07143 | 9/1999 | |
| 6,413,611 B1 | 7/2002 | Roberts et al. | WO | PCT/US99/18832 | 9/1999 | |
| H2047 H | 9/2002 | Harrison et al. | WO | WO 99/48746 | 9/1999 | |
| 6,455,146 B1 | 9/2002 | Fitzgerald | WO | PCT/US99/24795 | 10/1999 | |
| 6,474,722 B2 | 11/2002 | Barz | WO | PCT/DE99/04103 | 12/1999 | |
| 6,482,486 B1 | 11/2002 | Czaplicki et al. | WO | PCT/EP99/09541 | 12/1999 | |
| 6,482,496 B1 | 11/2002 | Wycech | WO | PCT/EP99/09732 | 12/1999 | |
| 2001/0020794 A1 * | 9/2001 | Ishikawa ................. 296/188 | WO | PCT/EP99/09909 | 12/1999 | |
| 2001/0042353 A1 | 11/2001 | Honda et al. | WO | PCT/EP99/10151 | 12/1999 | |
| 2002/0033617 A1 | 3/2002 | Blank | WO | PCT/US99/29986 | 12/1999 | |
| 2002/0053179 A1 | 5/2002 | Wycech | WO | PCT/US99/29987 | 12/1999 | |
| 2002/0054988 A1 | 5/2002 | Wycech | WO | PCT/US99/29990 | 12/1999 | |
| 2002/0074827 A1 | 6/2002 | Fitzgerald et al. | WO | PCT/US99/29991 | 12/1999 | |
| | | | WO | PCT/US99/29992 | 12/1999 | |

FOREIGN PATENT DOCUMENTS

| | | | | | |
|---|---|---|---|---|---|
| EP | 91104546.6 | 3/1991 | WO | PCT/US00/00010 | 1/2000 |
| EP | 94101343.5 | 1/1994 | WO | PCT/EP00/00021 | 1/2000 |
| EP | 95913082.4 | 3/1995 | WO | PCT/US00/00497 | 1/2000 |
| EP | 0 679 501 A1 | 11/1995 | WO | PCT/US00/01644 | 1/2000 |
| EP | 0 775 721 A1 | 5/1997 | WO | WO 00/03894 | 1/2000 |
| EP | 0 891 918 A1 | 1/1999 | WO | PCT/EP00/01474 | 2/2000 |
| EP | 0 893 331 A1 | 1/1999 | WO | PCT/US00/02631 | 2/2000 |
| EP | 0 893 332 B1 | 1/1999 | WO | PCT/AT00/00123 | 5/2000 |
| EP | 0 893 332 A1 | 1/1999 | WO | WO 00/37302 | 6/2000 |
| EP | 1 122 156 A2 | 8/2001 | WO | WO 00/55444 | 9/2000 |
| FR | 2749263 A1 | 5/1996 | WO | WO 01/54936 | 8/2001 |
| FR | 2 749 263 | 12/1997 | WO | WO 01/56845 | 8/2001 |
| GB | 628863 | 3/1947 | WO | WO 01/57130 | 8/2001 |
| GB | 8028960 | 9/1980 | WO | WO 01/71225 | 9/2001 |
| GB | 2 083 162 A | 3/1982 | WO | WO 01/83206 | 11/2001 |
| GB | 2 156 412 A | 10/1985 | WO | WO 01/88033 | 11/2001 |
| GB | 8725028 | 10/1987 | | | |
| GB | 2 325 509 A | 11/1998 | | | |
| JP | 61118211 | 6/1986 | | | |
| JP | 64-69308 | 3/1989 | | | |
| JP | 64-69309 | 3/1989 | | | |
| JP | 01164867 | 6/1989 | | | |
| JP | 2-206537 | 8/1990 | | | |
| JP | 5-38992 | 2/1993 | | | |
| JP | 10053156 A | 2/1998 | | | |
| JP | 2001191947 | 7/2001 | | | |
| JP | 2001-191949 * | 7/2001 | | | |
| WO | WO 87/01978 | 4/1987 | | | |
| WO | PCT/JP88/00029 | 1/1988 | | | |
| WO | PCT/AU92/00468 | 9/1992 | | | |
| WO | PCT/EP95/00896 | 3/1995 | | | |
| WO | PCT/US95/05749 | 5/1995 | | | |

OTHER PUBLICATIONS

Copending U.S. application Ser. No. 09/923,138 filed Aug. 6, 2001.

Copending U.S. application Ser. No. 09/939,152 filed Aug. 24, 2001.

Copending U.S. application Ser. No. 09/939,245 filed Aug. 24, 2001.

Copending U.S. application Ser. No. 09/974,017 filed Oct. 10, 2001.

Copending U.S. application Ser. No. 09/982,681 filed Oct. 18, 2001.

Copending U.S. application Ser. No. 60/296,312 filed Jun. 6, 2001.

Copending U.S. application Ser. No. 60/317,009 filed Sep. 4, 2001.
Co–pending application Ser. No. 09/524,960, filed Mar. 14, 2000.
Co–pending application Ser. No. 09/524,961; filed Mar. 14, 2000.
Co–pending application Ser. No. 09/428,243; filed Oct. 27, 1999.
Co–pending application Ser. No. 09/460,322; filed Dec. 10, 1999.
Co–pending application Ser. No. 09/524,298; filed Mar. 14, 2000.
Co–pending application Ser. No. 09/502,686; filed Feb. 11, 2000.
Co–pending application Ser. No. 09/676,443; filed Sep. 29, 2000.
Co–pending application Ser. No. 09/676,335; filed Sep. 29, 2000.
Co–pending application Ser. No. 09/591,877; filed Jun. 12, 2000.
Co–pending application Ser. No. 09/687,398; filed Oct. 13, 2000.
Co–pending application Ser. No. 09/584,211; filed May 31, 2000.

* cited by examiner

STRUCTURAL REINFORCEMENT SYSTEM FOR AUTOMOTIVE VEHICLES

The present application is a continuation and claims priority from commonly owned copending application titled, "Structural Reinforcement System for Automotive Vehicles", Ser. No. 09/502,686, filed Feb. 11, 2000.

FIELD OF THE INVENTION

The present invention relates generally to a reinforced structural member for use in strengthening the stiffness and strength of a frame assembly. More particularly, the invention relates to a vehicle frame system of an automotive vehicle that is reinforced by a member coated over a portion of its surface with an expandable material, the combination of which increases the structural stiffness and strength of the automotive vehicle.

BACKGROUND OF THE INVENTION

For many years the transportation industry has been concerned with designing reinforced structural members that do not add significantly to the weight of a vehicle. U.S. Pat. Nos. 5,755,486; 4,901,500; and 4,751,249 described prior art reinforcing devices. While these prior art devices may be advantageous in some circumstances, there is needed a simple low cost structure that permits coupling the reinforcement member to a variety of structures of varying geometric configurations. In the automotive industry there is also a need for a relatively low cost system for reinforcing automotive vehicle frame structures.

SUMMARY OF THE INVENTION

The present invention is directed to a structural reinforcement system, and particularly one for reinforcing automotive vehicle frame structures, such as (without limitation) vehicle roof and pillar structures. The system generally employs a skeleton member adapted for stiffening the structure to be reinforced and helping to redirect applied loads. In use, the skeleton member is in contact, over at least a portion of its outer surface, with an energy absorbing medium, and particularly heat activated bonding material. In a particular preferred embodiment, the skeleton member is a molded metal, or composite frame and it is at least partially coated with foamable epoxy-based resin, such as L5206, L5207, L5208 or L5209 structural foam commercially available from L & L Products of Romeo, Mich.

In one embodiment the skeleton member along with a suitable amount of bonding or load transfer medium is placed in a cavity defined within an automotive vehicle, such as a vehicle roof structure, pillar structure or both. The bonding medium is activated to accomplish expansion of the resin in the space defined between the skeleton member and the wall structure defining the cavity. The resulting structure includes the wall structure joined to the skeleton member with the aid of the structural foam.

DETAILED DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENT

Figure 1:
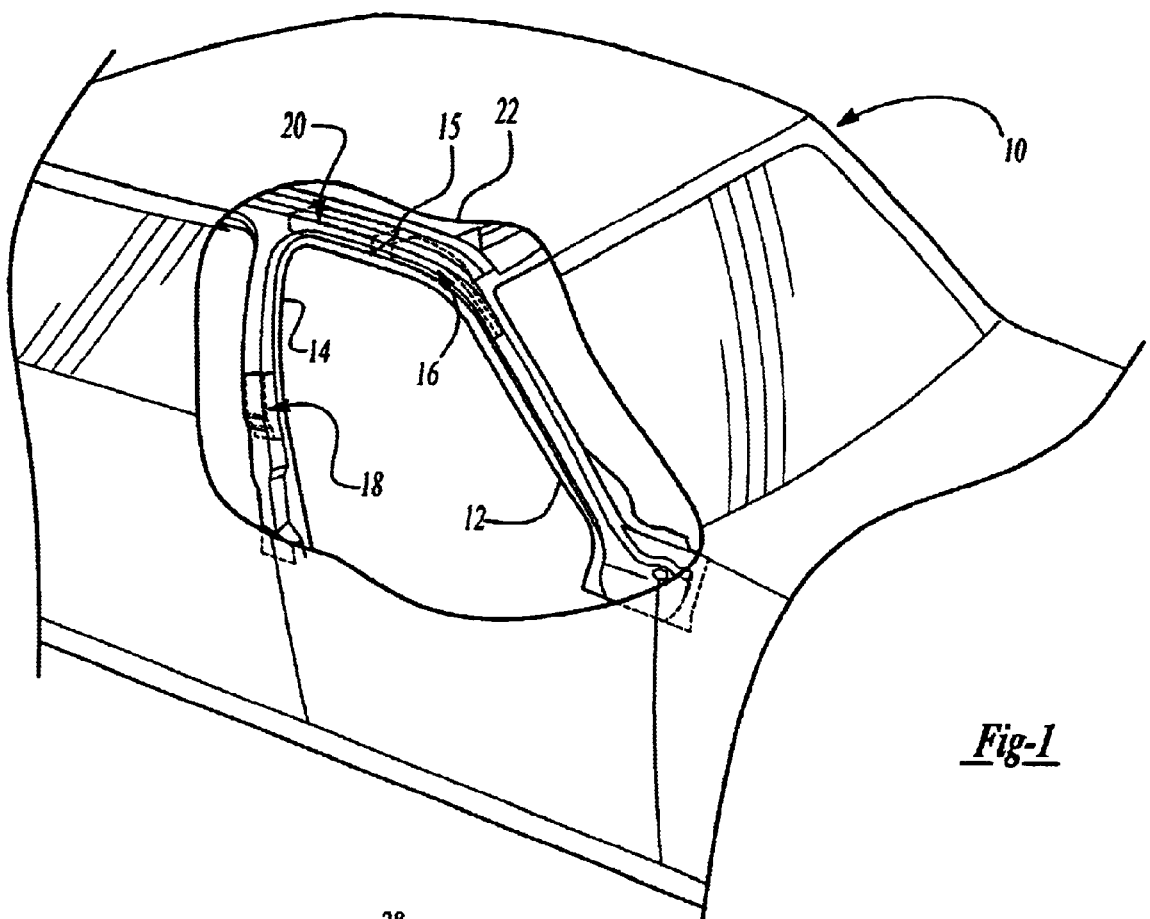
FIG. 1 is a perspective view of aspects of an automotive vehicle roof and pillar structure, illustrating an A-Pillar and B-Pillar.

FIG. 1 illustrates an example of an automotive vehicle 10 showing portions of a frame structure. As will be appreciated, it is common for such structures to include a plurality of hollow vehicle frame members that are joined to define the frame. One such structure, for purposes of illustration (without limitation) is a vehicle roof and pillar structure. As will be recognized, included in the roof and pillar structure may also be windows, sunroofs or other removable tops, vehicle doors and door components, headliners (with or without overhead accessories), or the like. As discussed later, other vehicle frame members are also contemplated within the scope of the present invention.

While FIG. 1 illustrates an A-Pillar 12 and B-Pillar 14, other pillars may likewise be employed in accordance with the present invention. In FIG. 1 there is shown also a portion of the roof structure 15 that bridges the A-Pillar 12 and B-Pillar 14.

Depending upon vehicle design, it is possible that the roof structure 15 bridging the A-Pillar and B-Pillar is relatively indistinguishable between the A-Pillar and B-Pillar such that the A-Pillar structure and B-Pillar structure effectively adjoin one another. In such instances the uppermost portion of the pillar structure is deemed the roof structure.

Reinforcement of the roof and pillar sections is accomplished by locating one or more skeleton members in accordance with the present invention in a hollow or cavity portion of the roof or pillar. FIG. 1 illustrates examples of this by showing a first skeleton member 16, a second skeleton member 18 and a third skeleton member 20 in such locations. The skeleton members 16, 18 and 20 preferably are sealingly secured to at least one of the roof and pillar sections by a bonding material, which upon heat activation produces adhesion to skeleton members to help secure the members and the walls defining the hollow from movement within the hollow portion.

Though other heat activated materials are possible, a preferred heat activated material is an expandable plastic, and preferably one that is foamable. A particularly preferred material is an epoxy-based structural foam. For example, without limitation, in one embodiment, the structural foam is an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing foams are known in the art and may also be used to produce the structural foam. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich., under the designations L5206, L5207, L5208 and L5209. One advantage of the preferred structural foam materials over prior art materials is that the preferred materials can be processed in several ways. The preferred materials can be processed by injection molding, extrusion compression molding or with a miniapplicator. This enables the formation and creation of part designs that exceed the capability of most prior art materials. In one preferred embodiment, the structural foam (in its uncured state) generally is dry or relatively free of tack to the touch.

While the preferred materials for fabricating the structural foam have been disclosed, the structural foam can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. patent application Ser. No. 09/268,810, now U.S. Pat. No. 6,131,897 issued Oct. 17, 2000, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion resistance properties. In this manner, the material does not generally interfere with the materials systems (e.g., heat applications, e-coat paint solvents) employed by automobile manufacturers.

In applications where a heat activated, thermally expanding material is employed, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the structural foam may be increased to as high as 1500 percent or more. Typically, strength is obtained from products that possess low expansion.

Figure 2:
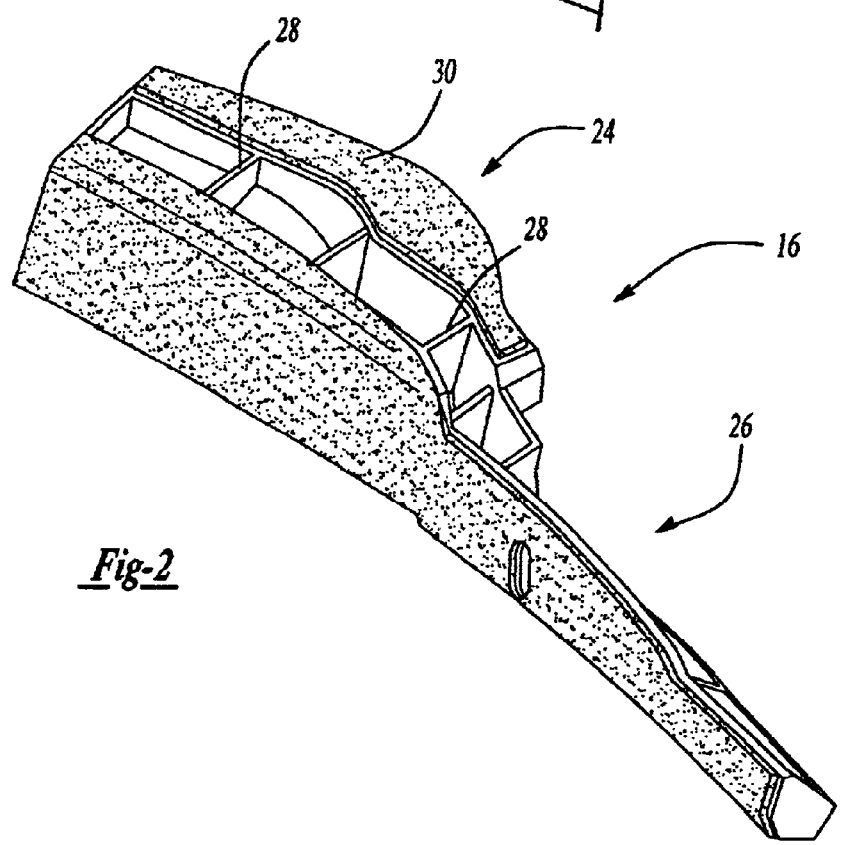
FIG. 2 is a perspective view of a skeleton member coated with an expandable resin in accordance with the present inventions.
Figure 3:
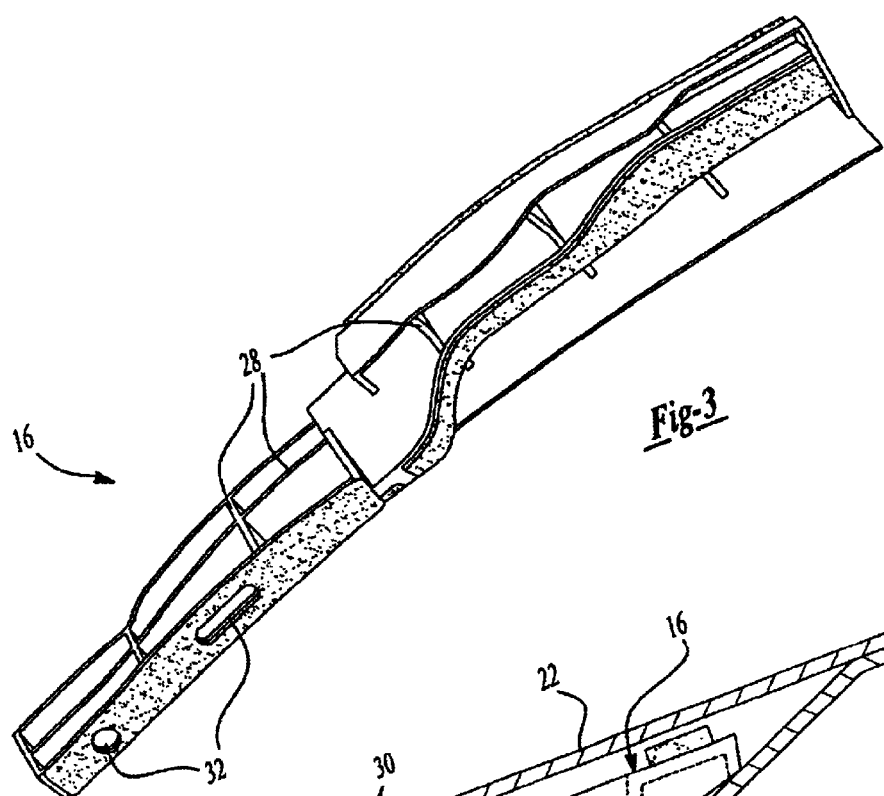
FIG. 3 is another perspective view of the structure shown in FIG. 2.

Referring now to FIG. 2, there is shown one example of a first reinforcing skeleton member 16 in accordance with the present invention. This illustrated embodiment is useful, for instance, for reinforcing the juncture between an automotive vehicle roof 22 and the A-Pillar. The first skeleton member 16 has a first portion 24 adapted for placement in a cavity defined in a vehicle roof structure, and a second portion 26 adapted for placement in a cavity defined in a vehicle pillar, such as an A-Pillar as illustrated. Preferably the cross sectional silhouette of both the first portion 24 and the second portion 26 is generally complementary to the walls of the cavity defined in opposing roof or pillar structure. Though the member may also be solid, the member preferably includes a skeleton frame that is prepared to minimize weight while still achieving desired rigidity. Accordingly, the skeleton frame preferably is designed to employ a plurality of ribs that effectively are beamlike (e.g. I-beam) in function, thus helping to selectively strengthen the member. The ribs are illustrated in FIGS. 2 and 3 generally running orthogonal to one another. However, this is not intended as limiting, as the rib configuration may be varied depending upon the desired outcome.

In general, however, a rib is placed adjacent to, and in generally non-parallel relationship to a surface over which loads will be distributed. In FIG. 2, by way of illustration, a plurality of first ribs 28 are located adjacent to a surface of the member (shown covered with expandable material 30). FIG. 3 also shows how the ribs 28 (reference numerals illustrating some of the ribs, but not all) can be configured relative to one another to provide additional stabilization. In general, because of the relatively high bending moment of the ribs, without unduly increasing weight of the member, rigidity can be increased in locations where loads are anticipated by selective design and placement of the ribs. At the same time, enhanced load distribution is possible from the continuous surfaces and foam employed with the ribs to spread energy. Moreover, weight savings can be achieved by such design. For instance, for a cross-section of the member taken at any point over at least one quarter, preferably one half and more preferably greater than about three quarter of the length of the member, the cross-sectional area of the member at the cross-section is less than 75%, more preferably less than 50% and still more preferably less than 20% of the overall area of a silhouette profile of the cross-section of the member. In this manner, weight reductions of up to about 50%, more preferably about 70%, and still more preferably about 90%, are possible as compared with a solid structure of the same material.

It should be appreciated that other devices for securing the skeleton member 16, 18, and 20 to the vehicle frame may be employed, including suitable fasteners, straps, or other mechanical interlocks. Through-holes 32 may also be defined within the structure to assist in vehicle manufacturing. In a particularly preferred embodiment, the skeleton members of the present invention are injection molded plastics, such as nylons. However, other materials and manufacturing techniques may be employed similarly to achieve like results. For instance, high strength to weight metal components, such as aluminum, titanium, magnesium or the like, may be employed, as well as polymer composites such as a layered polymer with fibers capable of compression molding to generate strength.

Returning to FIG. 1, when employed in an automotive vehicle in accordance with the present invention, the skeleton members, particularly when coated with an expandable material (such as a heat activated epoxy based foam), can reinforce the region for which it is used by the combination of increased stiffening from the presence of beam-like ribs and load distribution through the combination of relatively high surface area continuous surfaces and an expandable material.

Figure 4:
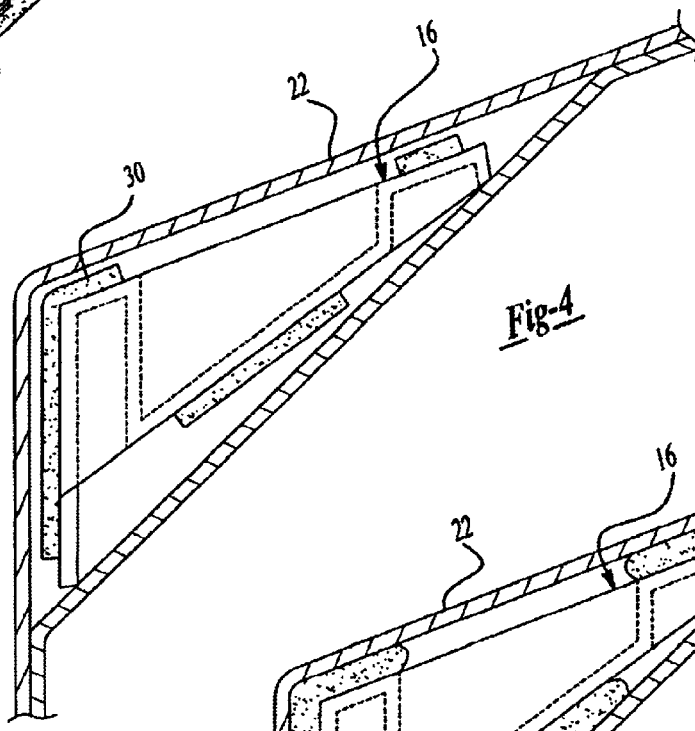
FIG. 4 is a sectional view showing a coated skeleton member prior to activation of an expandable resin.
Figure 5:
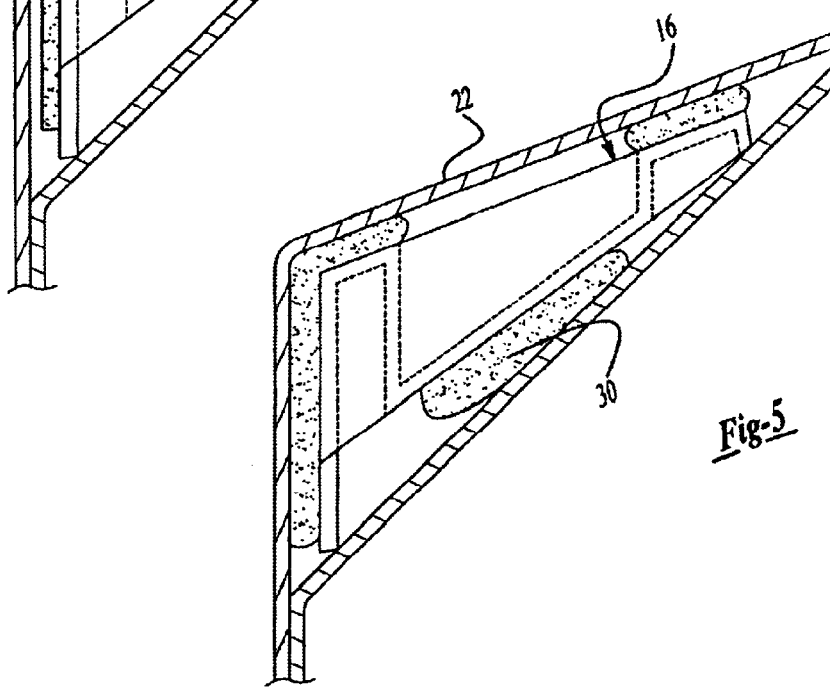
FIG. 5 illustrates the structure of FIG. 4 after the expandable resin has been expanded.

In another preferred embodiment, the expandable material, upon expansion will serve as a sealant for blocking the passage of fluids or other elements through the cavity. Thus, in such embodiment, it is preferred that the expandable material is provided continuously about generally the entirety of the periphery of any portion of the skeleton member that does not sealingly contact the automobile frame structure. FIG. 5 illustrates this by showing how skeleton member 16 coated with an expandable material 30 (shown in FIG. 4) is sealed in place upon activation of the material 30 (shown expanded in FIG. 5).

Figure 6:
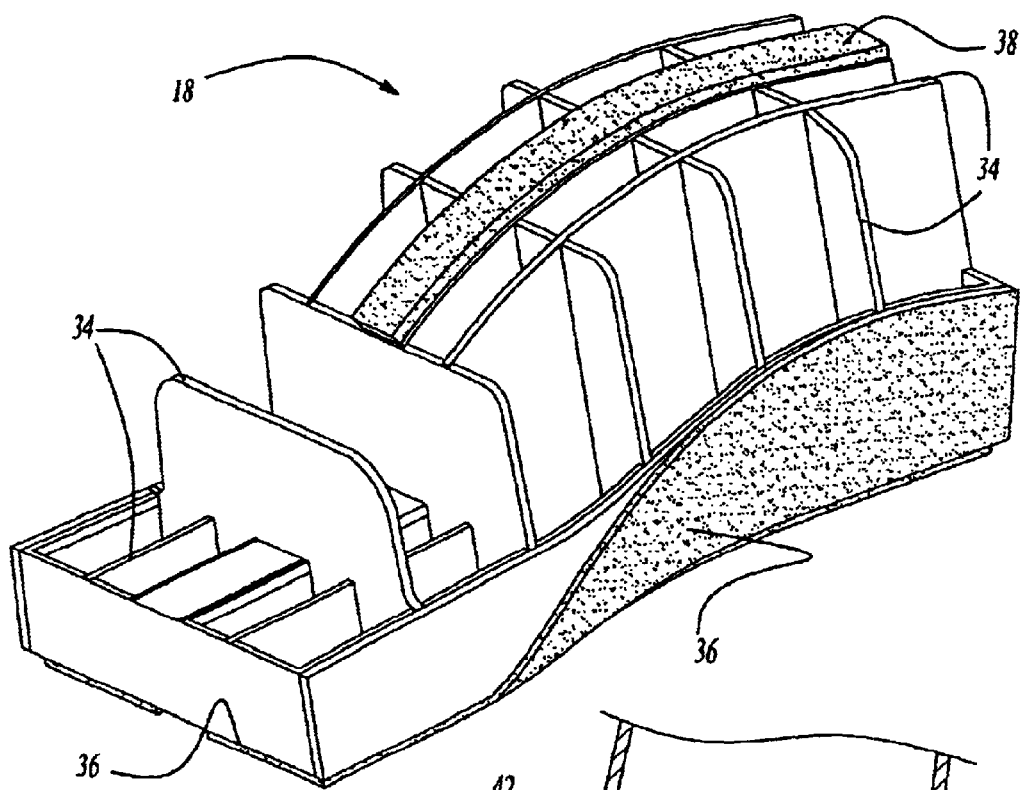
FIG. 6 is perspective view of another illustrative structure in accordance with the present invention.
Figure 7:
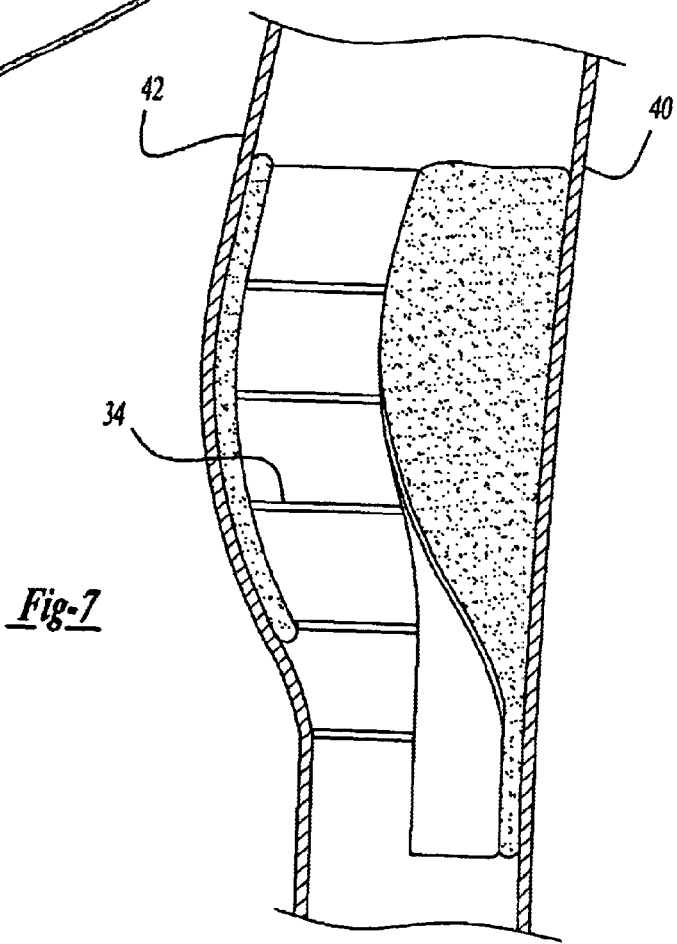
FIG. 7 is a side elevation view of the structure of FIG. 6.

FIGS. 6 through 9 illustrate other embodiments in accordance with the present invention. In FIGS. 6 and 7, there is shown a reinforcing skeleton member 18 adapted for a pillar of an automotive vehicle. The structure of the skeleton member employs a plurality of ribs 34 adjoining one or more continuous surfaces 36 (shown coated with an expandable material 38).

The expandable material is shown in its expanded state. As the skilled artisan will appreciate, not all ribs are shown, and the specific design of each rib configuration will vary depending upon its intended use, and the geometry of the region being reinforced (e.g. walls 40 and 42 of the vehicle frame structure defining the cavity). Further expandable material may be employed in contact with the ribs.

Figure 8:
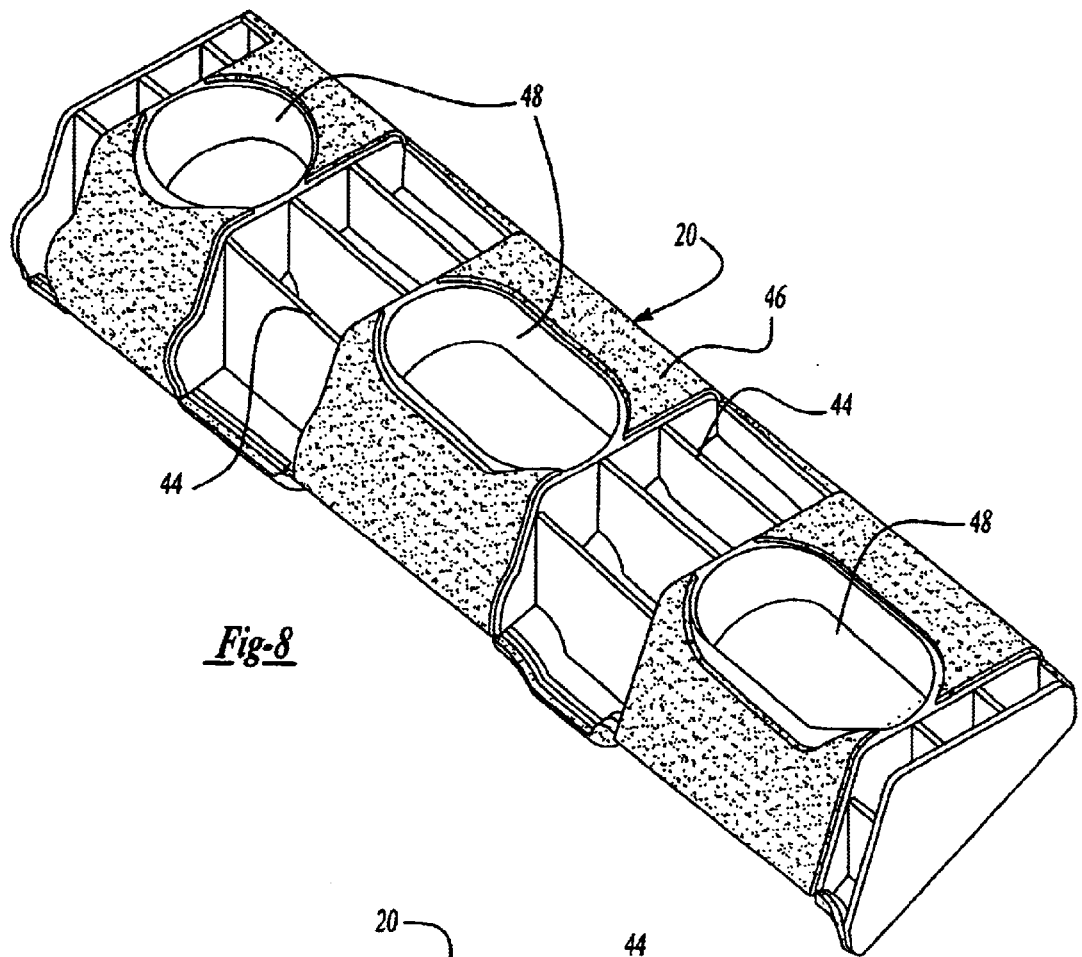
FIG. 8 illustrates yet another structure in accordance with the present invention.
Figure 9:
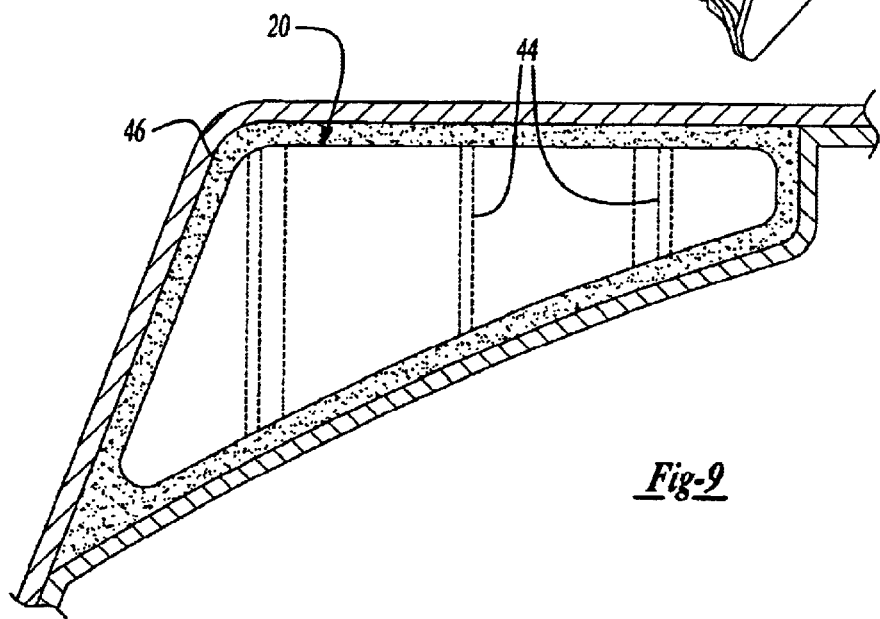
FIG. 9 illustrates the structure of FIG. 8 employed in combination with a vehicle pillar structure, the structure having a foam material disposed thereon, the foam material being in an expanded state.

FIGS. 8 and 9 illustrate yet another embodiment according to the present invention. In this embodiment, a skeleton member 20 having a plurality ribs 44 and generally continuous surfaces (shown coated with a layer 46) is fabricated to also include structure for facilitating vehicle manufacture. Specifically, the embodiment shown includes a plurality of through-holes 48, for enabling body shop weld access or the like. As shown in FIG. 9, in this embodiment, the expandable material layer 46, upon expansion, covers the circumference of a cross section of the structure.

The skilled artisan will appreciate that the use of the reinforcements disclosed herein is not intended as being limited only to illustrate the locations shown in FIG. 1. They can be used in any location within an automotive vehicle frame. For instance, other reinforced locations are also possible including but not limited to pillar to door regions, roof to pillar, mid-pillar, roof rails, windshield or other window frames, deck lids, hatches, removable top to roof locations, other vehicle beltline locations, motor rails, lower sills, cross members, lower rails, and the like. Moreover, vehicle roof tops may be reinforced to support additional loads in accordance with the present invention. In the same manner as was described above in the context of a roof and pillar system, a reinforcement frame member having an expandable material thereon is placed in a cavity defined in the vehicle frame structure. The material is expanded to help secure the reinforcement in place.

The preferred embodiment of the present invention has been disclosed. A person of ordinary skill in the art would realize however, that certain notifications would come within the teachings of this invention. Therefore, the following claims should be studied to determine the true scope and content of the invention.

What is claimed is:

1. A system for reinforcement of an automotive vehicle frame in response to an external load, comprising:

a molded plastic skeleton member having a longitudinal axis, the skeleton member including a first portion, a second portion and a ribbed portion, the ribbed portion positioned substantially entirely between the first and second portion, the second portion having a substantially continuous outer surface wherein:
  i) said outer surface of said second portion substantially defines a circumference of a cross-section taken laterally with respect to said longitudinal axis; and
  ii) said ribbed portion of said plastic skeleton member includes a plurality of beam elements extending vertically and longitudinally with respect to said longitudinal axis from said first portion to said second portion; and an expandable material substantially continuous about said circumference of said outer surface of said second portion such that, upon expansion, said expandable material and said skeleton member cooperatively laterally span a cavity for longitudinally sealing said cavity thereby blocking longitudinal passage of materials through said cavity, said expandable material configured to secure said plastic skeleton member to the automotive vehicle frame and provide energy distribution in conjunction with said plurality of beam elements wherein said plurality of beam elements is substantially devoid of said expandable material; and wherein said expandable material is an expandable plastic foam that is generally free of tack to the touch.

2. A member as in claim 1, wherein said skeleton member is formed of a fiber reinforced polymer and wherein said expandable material expands at least 1000 percent upon heat activation.

3. The system as claim in claim 1, wherein said first portion and said second portion are substantially aligned along said longitudinal axis.

4. The system as claimed in claim 1, wherein said skeleton member includes a first through-hole configured to facilitate manufacture of an automotive vehicle having said automotive vehicle frame.

5. The system as claimed in claim 3, wherein said skeleton member includes a first through-hole configured to facilitate manufacture of an automotive vehicle having said automotive vehicle frame.

6. The system as claimed in claim 1, wherein said expandable material is an epoxy-based polymer foam.

7. The system as claimed in claim 3, wherein said expandable material is an epoxy-based polymer foam.

8. The system as claimed in claim 4, wherein said expandable material is an epoxy-based polymer foam.

9. The system as claim in claim 1, wherein said expandable material is heat activated at a temperature in the range of about 148.89° C. to about 204.44° C.

10. The system as claim in claim 3, wherein said expandable material is heat activated at a temperature in the range of about 148.89° C. to about 204.44° C.

11. The system as claim in claim 4, wherein said expandable material is heat activated at a temperature in the range of about 148.89° C. to about 204.44° C.

* * * * *

UNITED STATES PATENT AND TRADEMARK OFFICE
CERTIFICATE OF CORRECTION

PATENT NO. : 6,619,727 B1
DATED : September 16, 2003
INVENTOR(S) : William Barz, Thomas L. Coon and Michael J. Czaplicki It is certified that error appears in the above-identified patent and that said Letters Patent is hereby corrected as shown below:

<u>Title page,</u>
Item [56], References Cited, OTHER PUBLICATIONS, add:
-- Copending U.S. application Ser. No. 09/591,877 filed June 12, 2000 --.

Signed and Sealed this

Ninth Day of March, 2004

JON W. DUDAS
*Acting Director of the United States Patent and Trademark Office*